(12) United States Patent
McDonald et al.

(10) Patent No.: US 8,095,256 B2
(45) Date of Patent: Jan. 10, 2012

(54) SYSTEM AND METHOD FOR USING VEHICLE ATTRIBUTES TO IDENTIFY A VEHICLE UNDER SERVICE

(75) Inventors: Stuart McDonald, Clonakilty (IE); Carl J. Krzystofczyk, Mount Prospect, IL (US)

(73) Assignee: Snap-on Incorporated, Konosha, WI (US)

( * ) Notice: Subject to any disclaimer, the term of this patent is extended or adjusted under 35 U.S.C. 154(b) by 1196 days.

(21) Appl. No.: 11/758,580

(22) Filed: Jun. 5, 2007

(65) Prior Publication Data

US 2008/0306646 A1 Dec. 11, 2008

(51) Int. Cl.
*G05B 19/00* (2006.01)
(52) U.S. Cl. .......................................... 701/29; 340/988
(58) Field of Classification Search .................... 701/29; 340/988, 989, 991–993, 995.1, 902, 905, 340/426.3, 286.01, 10.1, 10.6; 342/457, 342/458, 463
See application file for complete search history.

(56) References Cited

U.S. PATENT DOCUMENTS

| | | | |
|---|---|---|---|
| 5,201,046 A | 4/1993 | Goldberg et al. | |
| 6,980,963 B1 | 12/2005 | Hanzek | |
| 7,302,371 B2 * | 11/2007 | Oesterling et al. | 703/7 |
| 7,509,328 B2 * | 3/2009 | Weiss et al. | 1/1 |
| 2005/0289154 A1 | 12/2005 | Weiss et al. | |
| 2005/0289158 A1 | 12/2005 | Weiss et al. | |
| 2008/0204191 A1 * | 8/2008 | Alrabady | 340/5.21 |

FOREIGN PATENT DOCUMENTS

WO 2004/092918 A2 10/2004
WO 2006/071705 A1 7/2006

OTHER PUBLICATIONS

Van Der Haegen, D., European Patent Office, Supplementary European Search Report for European Patent Application No. EP 08 76 9274, Dec. 7, 2010.
International Search Report and Written Opinion for International Patent Application No. PCT/US08/62491, dated Dec. 5, 2008.
The International Bureau of WIPO, International Preliminary Report on Patentability for International application No. PCT/US2008/062491, report issued on Dec. 7, 2009.
Australian Government, IP Australia, Examiner's First Report on patent application No. 2008262164, Oct. 21, 2010.

* cited by examiner

*Primary Examiner* — Dalena Tran
(74) *Attorney, Agent, or Firm* — McDonnell Boehnen Hulbert & Berghoff LLP

(57) ABSTRACT

A system and method directed to determining vehicle attributes associated with a vehicle under service so as to eliminate the need for a user of a vehicle service tool to enter the vehicle attributes or to reduce the quantity of vehicle attributes that the user has to enter in order for the vehicle service tool to identify the vehicle under service and, in turn, to retrieve vehicle reference data associated with the vehicle under service. The vehicle service tool may include vehicle service applications for servicing various systems and/or components of the vehicle under service. A vehicle service application selected by the user may function as a requester application that queries other applications and/or data storage for the vehicle attributes needed by the requester application to identify the vehicle under service.

23 Claims, 4 Drawing Sheets

SYSTEM AND METHOD FOR USING VEHICLE ATTRIBUTES TO IDENTIFY A VEHICLE UNDER SERVICE

FIELD OF THE DISCLOSURE

This disclosure relates to servicing of vehicles, and more particularly to vehicle service tools that use vehicle reference data associated with a vehicle under service.

BACKGROUND

Vehicle manufacturers and/or suppliers of components and systems that are installed on a vehicle typically define vehicle reference data for use in servicing the vehicle, and in particular, the components and systems installed on the vehicle. As an example, a vehicle manufacturer may define, for an internal combustion engine installed in a vehicle, vehicle reference data such as engine coolant temperature data, mass air flow sensor data, and throttle position sensor data.

The owner of a vehicle may take their vehicle to a service facility where some type of vehicle service may be carried out on the vehicle (i.e., the vehicle under service). Depending on the type of vehicle service carried out, a technician at the service facility may use a vehicle service tool, such as the MODIS Modular Diagnostic Information System (Elite 7.2), manufactured by Snap-on Incorporated, Kenosha, Wis.

Vehicle service tools may include applications that use vehicle reference data to carry out various application functions. A vehicle service tool may include vehicle reference data for a plurality of different vehicle makes and models. In order to use the proper vehicle reference data for the vehicle under service, each application on the vehicle service tool typically prompts a user to select one or more vehicle attributes associated with the vehicle under service until the user enters a sufficient number of vehicle attributes such that the vehicle service tool may determine the proper vehicle reference data.

The vehicle attributes needed by each application of a vehicle service tool may be the same as the vehicle attributes needed by other applications or may be different from the vehicle attributes needed by other applications. In some situations, an application of a vehicle service tool may prompt a user to re-enter a vehicle attribute that the user entered previously for another application of the vehicle service tool while serving the same vehicle. In such situations, the user of the vehicle service tool may become annoyed and/or frustrated that the user has to re-enter the same vehicle attribute while using the vehicle service tool to service the same vehicle.

SUMMARY

Described is a method and system for a vehicle service tool to determine vehicle attributes associated with a vehicle under service so that a technician servicing the vehicle does not have to enter any vehicle attributes or has to enter fewer vehicle attributes via a user interface of the vehicle service tool. The vehicle service tool may determine the attributes from a "master application" (contained on the vehicle service tool) that is considered more likely to have a requested vehicle attribute than a "peer application" (contained on the vehicle service tool), or may determine the attributes from a "peer application." Additionally, the method and system provide for deriving vehicle attributes from other known vehicle attributes for the vehicle under service. The vehicle attributes, determined or derived, may be used to identify a vehicle under service so that appropriate vehicle reference data for the vehicle under service may be retrieved and presented to a user of the vehicle service tool.

In one respect, an exemplary embodiment is arranged as a method carried out via a vehicle service tool including data storage, a user interface, and a requestor application that requests vehicle attributes to identify a vehicle. The method comprises (i) receiving from the requester application a first request for a first vehicle attribute, and (ii) performing a first search of the data storage so as to determine whether the data storage contains the first vehicle attribute for the requestor application. In accordance with this exemplary embodiment, (i) if a result of the first search indicates the data storage contains the first attribute for the requester application, the method further comprises providing the first vehicle attribute for the requester application from the data storage to the requestor application, (ii) if the result of the first search indicates the data storage does not contain the first vehicle attribute for the requestor application, the method further comprises performing a second search of the data storage so as to determine whether the data storage contains the first vehicle attribute for another application, and (iii) if a result of the second search indicates the data storage contains the first vehicle attribute for the other application, the method further comprises providing the first vehicle attribute for the other application from the data storage to the requester application. If a result of the second search indicates the data storage does not contain the first vehicle attribute for the other application, the method may further comprise receiving the first vehicle attribute from the user interface and providing the first vehicle attribute received from the user interface to the requestor application. The first vehicle attribute received from the user interface may also be provided to the data storage as an attribute for the requestor application and for future use by the requester application or another application.

In another respect, an exemplary embodiment is arranged as a vehicle service tool comprising: a user interface, a processor, and data storage containing: (i) a computer-readable requester application, (ii) a computer-readable interceptor application, and (iii) a computer-readable common vehicle descriptor (CVD) application. The requestor application, the interceptor application, and the CVD application are executable by the processor. In accordance with this exemplary embodiment, the requester application provides to the interceptor application a first request for a vehicle attribute, and receives from the interceptor application the requested vehicle attribute. The interceptor application (i) receives from the requestor application the first request for the vehicle attribute and responsively provides the CVD application with a second request for the vehicle attribute, (ii) receives from the CVD application (a) a non-match indicator, or (b) a match indicator and the requested vehicle attribute.

The CVD application may carry out a "smart-compare" function to identify that any of two or more forms of a vehicle attribute may be used as the vehicle attribute for the requester application. For example, the CVD application may identify that a first application refers to a vehicle manufactured with the trademark of Chevrolet as a "Chevrolet," whereas a second application refers to the vehicle as a "Chevy," and a third application refers to the vehicle as a "Chev." If the requester application requires an un-shortened vehicle make attribute, the CVD application may determine the vehicle attribute for the second application (i.e., Chevy), translate "Chevy" to "Chevrolet" and provide the interceptor application with the vehicle attribute "Chevrolet" for the requestor application. In this way, the CVD application allows an application that stores vehicle attributes in a format different than the format required by the requester application to share the vehicle attribute information for that application with the requester application.

In response to receiving the non-match indicator, the interceptor application provides to the user interface a third request for the vehicle attribute, receives the requested vehicle attribute from the user interface, and provides the requested vehicle attribute to the requester application. The requested vehicle attribute received from the user interface may also be provided from the interceptor application to the CVD application. The CVD application may then cause the requested vehicle attribute to be stored in data storage as a vehicle attribute for the requestor application.

In response to receiving the match indicator, the interceptor application provides the requested vehicle attribute received from the CVD application to the requester application. The CVD application: (i) searches the data storage to determine whether the data storage contains the requested vehicle attribute, and (ii) provides to the interceptor application the non-match indicator if the data storage does not contain the requested vehicle attribute or provides to the interceptor application the match indicator and the requested vehicle attribute if the data storage contains the requested vehicle attribute.

In yet another respect, an exemplary embodiment is arranged as a vehicle service tool comprising a user interface, a processor, and data storage containing computer-readable program instructions executable by the processor. The computer-readable program instructions comprise: (i) a first set of program instructions arranged as a first application that requests a first vehicle attribute for use in identifying a vehicle, (ii) a second set of program instructions arranged as second application associable with a vehicle attribute, (iii) a third set of program instructions executable to cause the processor to perform a first search of the data storage so as to determine whether the data storage contains the first vehicle attribute for the first application, wherein the third set of program instructions are executed in response to the first application requesting the first vehicle attribute, (iv) a fourth set of program instructions executable to cause the first vehicle attribute for the first application to be provided to the first application, wherein the fourth set of program instructions are executed if a result of the first search indicates the data storage contains the first vehicle attribute for the first application, (v) a fifth set of program instructions executable to cause the processor to perform a second search of the data storage to determine whether the data storage contains the first vehicle attribute for the second application, wherein the fifth set of program instructions are executed if the result of the first search indicates the data storage does not contain the first vehicle attribute for the first application, and (vi) a sixth set of program instruction executable to cause the first vehicle attribute for the second application to be provided to the first application, wherein the sixth set of program instructions are executed if a result of the second search indicates the data storage contains the first vehicle attribute for the second application.

These as well as other aspects and advantages will become apparent to those of ordinary skill in the art by reading the following detailed description, with reference where appropriate to the accompanying drawings.

BRIEF DESCRIPTION OF DRAWINGS

Various examples of embodiments arranged as a method or a system are described herein with reference to the following drawings, in which.

DETAILED DESCRIPTION

1. Overview

Figure 1:
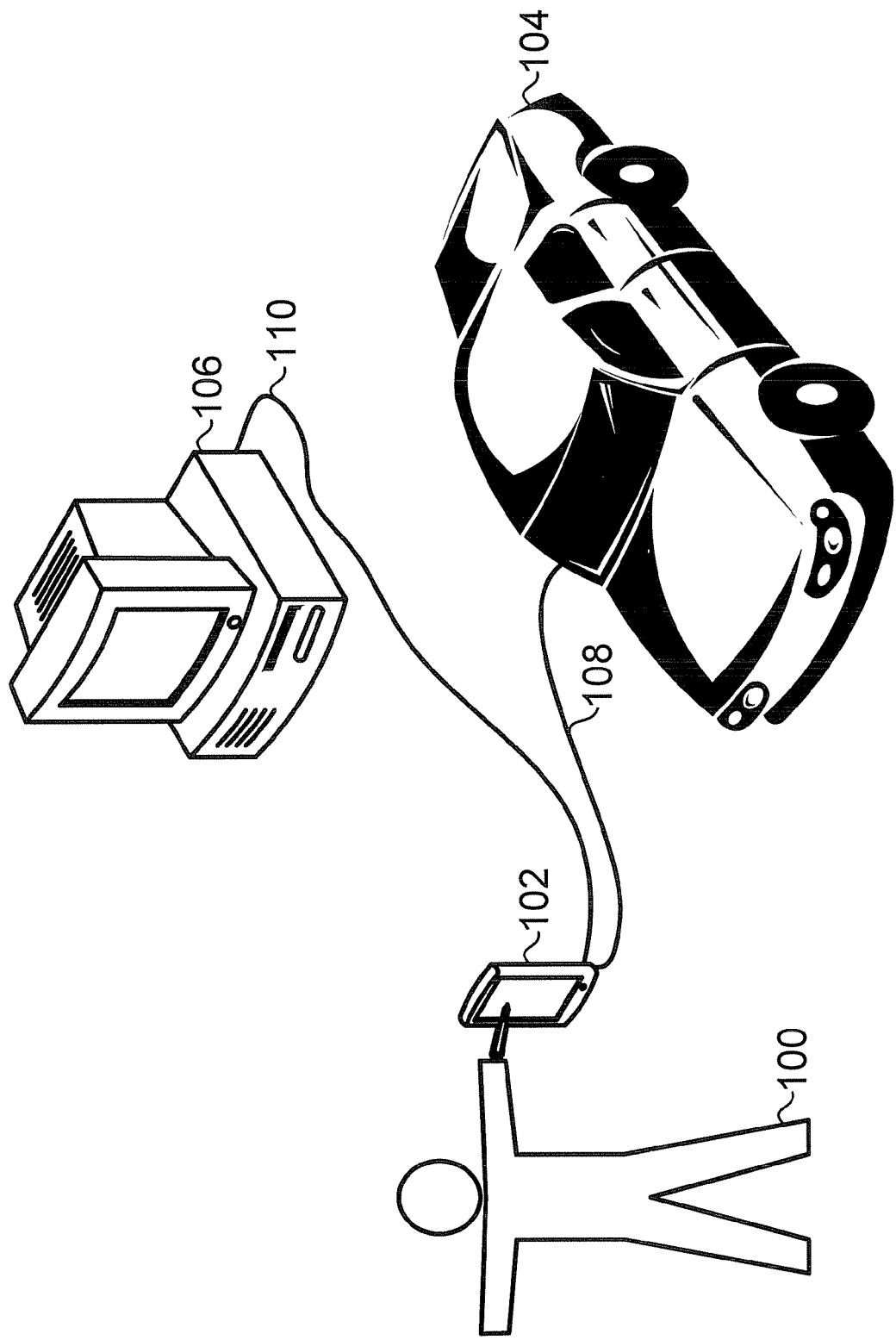
FIG. 1 depicts an arrangement in which an exemplary method and system may be carried out.

This description describes a system and method for a vehicle service tool to determine vehicle attributes for identifying a vehicle under service. The vehicle service tool may comprise a user interface and data storage containing a plurality of vehicle service applications and vehicle reference data for use by the plurality of vehicle service applications. As an example, the vehicle service applications may include an engine service application for use in servicing an internal combustion engine installed in the vehicle under service. As another example, the vehicle reference data may include engine coolant temperature parameters associated with the engine of the vehicle under service.

Upon selection of a vehicle service application for a vehicle under service, the selected application may function as a requestor application that requests one or more vehicle attributes for use in identifying the vehicle under service. An interceptor application may receive from the requester application a request for a vehicle attribute and thereafter provide the request to a common vehicle descriptor application. The interceptor application may also receive from the requester application a list of possible answers to the request for the vehicle attribute. For example, if the requested vehicle attribute is a vehicle "make" attribute, the interceptor application may receive a list of vehicle makes such as Dodge, Ford, GM and Toyota. The list of possible answers may indicate the vehicle attribute answers that the requester application may accept as the requested vehicle attribute.

The common vehicle descriptor application may cause the data storage to be searched for the requested vehicle attribute. In this regard, the data storage may be searched to determine whether the data storage contains the vehicle attribute for the requestor application or for another application, such as another vehicle service application. As an example, the data storage may contain the vehicle attribute for the requester application if the data storage contains the vehicle attribute and data that associates the vehicle attribute to the requestor application and to the vehicle under service. Similarly, and by way of example, the data storage may contain the vehicle attribute for the other application if the data storage contains the vehicle attribute and data that associates the vehicle attribute to the other application and to the vehicle under service.

In particular, the common vehicle descriptor application may cause the data storage to be searched to determine whether the data storage contains a vehicle attribute contained in the list of possible answers for the requested vehicle attribute. In this regard, the CVD application may receive the list of possible answers for the requested vehicle attribute from the interceptor application.

If the data storage contains the requested vehicle attribute for the requestor application or for the other application (e.g., an attribute listed in the list of possible answers for the requested attribute), the common vehicle descriptor application provides the requested vehicle attribute from the data storage to the interceptor application. The common vehicle descriptor application may also provide to the interceptor application an indication whether the requested vehicle attribute is for the requestor application or for the other application. This indication may be in the form of a match indicator. Thereafter, the interceptor application may provide the requested vehicle attribute to the requestor application.

If the data storage does not contain the requested vehicle attribute for the requestor application or the other application, the common vehicle descriptor application may provide to the interceptor application an indication that the data storage does not contain the requested vehicle attribute. This indication may be in the form of a non-match indicator. In response to receiving this indication, the interceptor application may prompt the user interface to request a user to enter the requested vehicle attribute and, upon receiving the requested vehicle attribute from the user interface, provide the requested vehicle attribute to the requestor application.

After receiving the requested vehicle attribute, the requestor application may use the requested vehicle attribute to identify the vehicle under service. If the requester application needs the requested vehicle attribute and another vehicle attribute to be able to identify the vehicle under service, the requester application may provide to the interceptor application a request for the other vehicle attribute. Thereafter, the interceptor application and the common vehicle descriptor application may be executed so as to obtain for the requestor application the other vehicle attribute from the data storage or from the user interface.

2. Exemplary Architecture

FIG. 1 depicts an arrangement in which an exemplary method and system may be carried out. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

As shown in FIG. 1, a service technician 100 has a vehicle service tool 102 that interfaces to a vehicle 104 (e.g., the vehicle under service) and to a remote vehicle service tool interface device 106. Vehicle service tool 102 may interface to vehicle 104 via a vehicle interface cable 108. Alternatively or additionally, vehicle service tool 102 may interface to vehicle 104 via an air interface (i.e., wirelessly). Vehicle service tool 102 may interface to the interface device 106 via a network cable 110, such as an Ethernet network cable. Alternatively or additionally, vehicle service tool 102 may interface to interface device 106 via an air interface.

Vehicle service tool 102 may be arranged in any of a variety of configurations. For example, vehicle service tool 102 may be arranged as a portable handheld service tool that can be carried by service technician 100 to a location desired by the service technician 100, such as the front seat of vehicle 104 or an engine compartment under a hood of vehicle 104. As another example, vehicle service tool 102 may be arranged as a desktop personal computer placed on a roll-around cart that may be rolled in proximity to vehicle 104. As yet another example, vehicle service tool 102 may be arranged in a distributed configuration in which vehicle service tool 102 comprises interface device 106 or in a stand-alone configuration in which vehicle service tool 102 functions without interfacing to interface device 106. Other exemplary arrangements of vehicle service tool 102 are also possible.

Vehicle 104 is an automobile. Alternatively, and by way of example, a vehicle that communicates with vehicle service tool 102 may comprise a truck, a boat or ship, a motorcycle, a generator, or an airplane. Any of these vehicles may be a vehicle under service. Other examples of a vehicle that communicates with vehicle service tool 102 are also possible.

Vehicle service tool interface device 106 may comprise any of a variety of devices. For example, interface device 106 may comprise a network server and/or a desktop computer executing computer-readable program instructions to carry out service shop management functions and/or program instructions to provide vehicle reference data to vehicle service tool 102. Other examples of interface device 106 are also possible.

The embodiments described herein may include or be utilized with any appropriate voltage or current source, such as a battery, an alternator, a fuel cell, and the like, providing any appropriate current and/or voltage, such as about 12 Volts, about 42 Volts and the like.

Additionally, the embodiments described herein may be used with any desired system or engine. Those systems or engines may comprises items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

Figure 2:
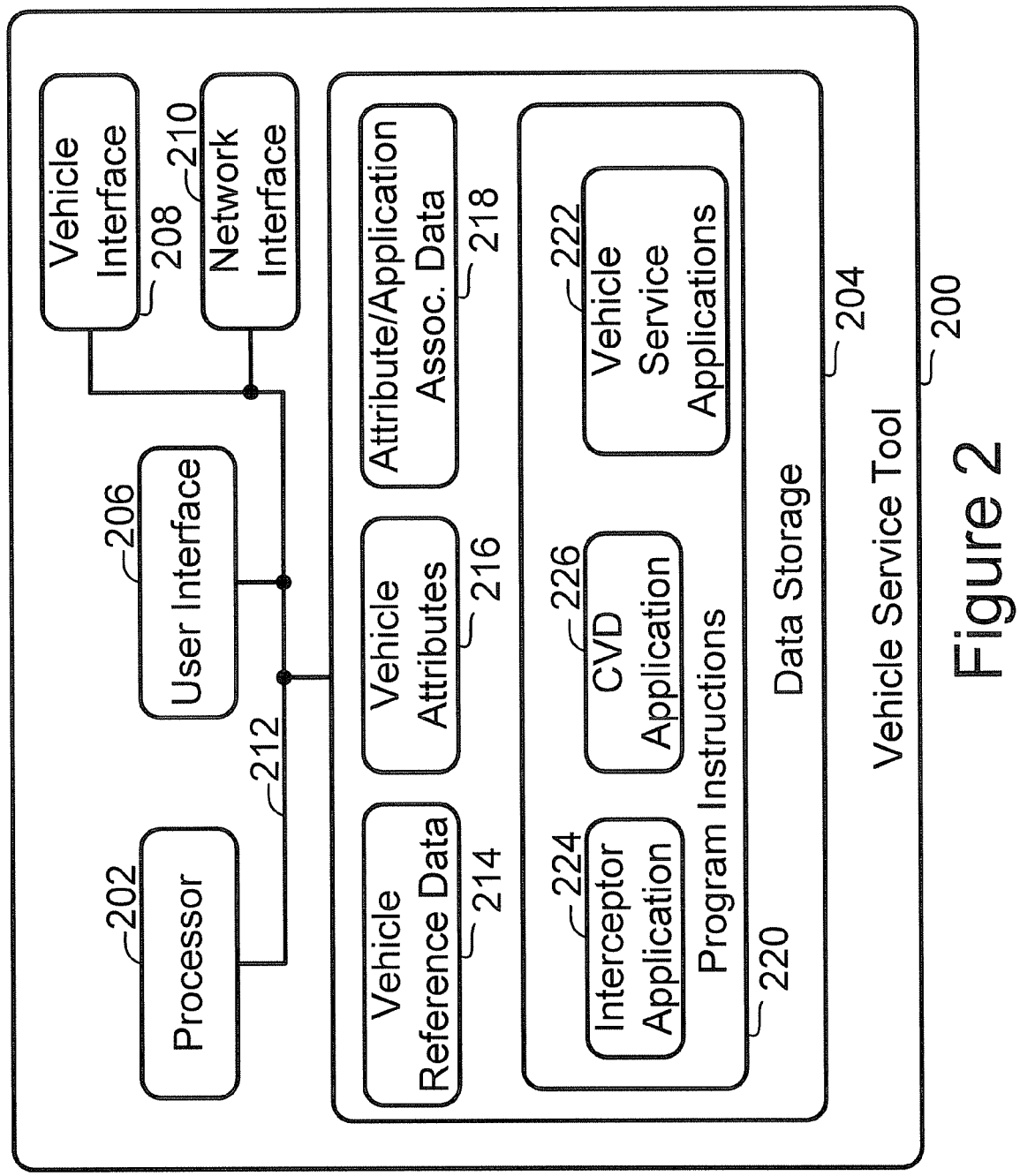
FIG. 2 depicts a simplified block diagram of an exemplary vehicle service tool.

FIG. 2 depicts an exemplary vehicle service tool 200 that may be used to carry out an exemplary embodiment. As shown in FIG. 2, vehicle service tool 200 comprises a processor 202, data storage 204, a user interface 206, a vehicle interface 208, and a network interface 210, all linked together via a system bus, network, or other connection mechanism 212. Vehicle service tool 102 of FIG. 1 may be configured as vehicle service tool 200. In this regard, vehicle interface 208 may connect to vehicle interface cable 108 for carrying communications between vehicle service tool 200 and vehicle 104, and network interface 210 may connect to network cable 110 for carrying communications between vehicle service tool 200 and vehicle server tool interface device 106.

User interface 206 may comprise any of a variety of user interface components. For example, user interface 206 may comprise a display for displaying data to a user, such as vehicle reference data and/or a message for prompting a user to enter data via the user interface 206. The display may comprise a liquid crystal display (LCD) display, a cathode ray tube (CRT) display, a plasma display, or another type of display. As another example, user interface 206 may comprise a data entry component, such as a keyboard in a QWERTY keyboard arrangement, a touch screen such as a resistive or capacitive touch screen, or another type of data entry component.

Processor 202 may comprise one or more general purpose processors (e.g., INTEL microprocessors) and/or one or more special purpose processors (e.g., digital signal processors). Processor 202 may execute computer-readable program instructions, such as the program instructions described in this description.

Data storage 204 comprises a computer readable medium. A computer readable medium may comprise volatile and/or non-volatile storage components, such as optical, magnetic, organic or other memory or disc storage, which can be integrated in whole or in part with a processor, such as processor 202. Alternatively, the entire computer readable medium may be remote from processor 202 and coupled to processor 202 by connection mechanism 212 and/or network cable 110.

Data storage 204 may contain various types of data, such as vehicle reference data 214, vehicle attributes 216, vehicle/attribute/application association data 218, and computer-readable program instructions 220. The program instructions 220 include one or more vehicle service applications 222, an interceptor application 224, and a common vehicle descriptor (CVD) application 226. Data storage 204 may contain other data in addition to the data shown in FIG. 2.

Vehicle reference data 214 may comprise a variety of vehicle reference data. Table 1 depicts exemplary vehicle reference data for automotive vehicles defined by vehicle attributes including a year attribute, a make attribute, a model attribute, and an engine attribute. For each defined vehicle in Table 1, each row includes vehicle reference data including oil pressure reference data, fuel pressure reference data, and thermostat opening temperature reference data.

As an example, the second row of Table 1 comprises vehicle reference data for a vehicle defined as a model year 2004 Pontiac Grand Prix having a 3.4 Liter (L) engine. Other examples of vehicle reference data 214, including but not limited to vehicle reference data associated with a vehicle supplemental restraint system (e.g., an airbag system), a vehicle transmission, or a vehicle heating, ventilation, and air conditioning (HVAC) system, are also possible.

TABLE 1

Vehicle Reference Data

| Vehicle Attributes | | | | Vehicle Reference Data | | |
|---|---|---|---|---|---|---|
| Year | Make | Model | Engine | Oil Press. | Fuel Press. | Thermostat Opening Temperature |
| 2004 | Pontiac | Grand Prix | 3.4 L. | 40 PSI at 2,000 RPM | 25 PSI at 2,000 RPM | 185° F./ 85° C. |
| 2003 | Pontiac | Grand Am | 3.1 L | 45 PSI at 2,500 RPM | 30 PSI at 2,000 RPM | 180° F./ 82.2° C. |
| 1990 | Ford | F150 | 5.7 L | 50 PSI at 2,000 RPM | 20 PSI at 2,000 RPM | 190° F./ 87.8° C. |

Vehicle attributes 216 may comprise a variety of attributes that may be used by vehicle service tool 200, and in particular, by the vehicle service applications 222, to identify a vehicle under service. Table 2 depicts an example of vehicle attributes associated with three vehicles, namely Vehicle 1, Vehicle 2, and Vehicle 3. As an example, the vehicle attributes associated with Vehicle 1 are shown in the second row of Table 2. A vehicle service application may request vehicle attributes such as a "vehicle identification number (VIN)" attribute, a "year" attribute, a "make" attribute, a "model" attribute, an "engine" attribute, an "airbag" attribute, and an "HVAC" attribute. Other examples of vehicle attributes are also possible.

TABLE 2

Vehicle Attributes

| | VIN | Year | Make | Model | Country | Engine | Trans. | Airbags | HVAC |
|---|---|---|---|---|---|---|---|---|---|
| Vehicle 1 | 639X725 | 2004 | Pontiac | Grand Prix | U.S. | 3.4 L. | 4-speed auto. | Driver & Pass. | Dual Zone w/A.C. |
| Vehicle 2 | 642Y817 | 2003 | Pontiac | Grand Am | U.S. | 3.1 L | 4-speed auto. | Driver only | Single Zone w/A.C. |
| Vehicle 3 | 44TF231 | 1990 | Ford | F150 | U.S. | 5.7 L | 4-speed manual | None | Vent |

The vehicle/attribute/application association data 218 may comprise various data to associate a vehicle, a vehicle attribute, and a vehicle service application. Table 3 depicts an example of vehicle/attribute/application association data for three vehicle service applications, namely an engine service application, an airbag service application, and an HVAC service application. As shown in Table 3, the engine service application for Vehicle 1 does not have any stored attributes, however the airbag service application has a "year" attribute and a "make" attribute stored for Vehicle 1. In this regard, the airbag service application may have the year 2004 stored as the "year" attribute and Pontiac as the "make" attribute for Vehicle 1.

TABLE 3

Vehicle/Attribute/Application Association Data

| | Stored Attributes for Engine Service Application | Stored Attributes for Airbag Service Application | Stored Attributes for HVAC Service Application |
|---|---|---|---|
| Vehicle 1 (VIN = 639X725) | None | Year, Make | Year, HVAC |
| Vehicle 2 (VIN = 642Y817) | Year, Make, Model | Model | HVAC |
| Vehicle 3 (VIN = 44TF231) | Year, Make, Model, Engine | Year | Year, Make, Model |

The program instructions 220 may comprise computer-readable program instructions executable by processor 202 so as to carry out functions described herein. As an example, the program instructions 220 may comprise computer-readable program instructions arranged as one or more vehicle service applications 222, an interceptor application 224, and a common vehicle descriptor (CVD) application 226.

The vehicle service applications 222 may be executed by processor 202 so as to carry out a variety of functions. For example, the vehicle service applications 222 may include an engine service application, an airbag service application, and an HVAC service application.

Each of the one or more vehicle service applications 222 may function as a requestor application that requests a vehicle attribute. For example, after selecting a given vehicle service application (e.g., the engine service application) via the user interface 206, the engine service application may provide to the interceptor application 224 a request for a vehicle attribute needed by the engine service application to identify the vehicle under service.

The interceptor application 224 may be executed by processor 202 so as to carry out a variety of functions. For example, execution of interceptor application 224 may cause a request for a vehicle attribute to be provided to the CVD application 226 in response to the interceptor application 224 receiving a request for the vehicle attribute from a requester application.

As yet another example, the program instructions 220 may comprise computer-readable program instructions arranged as the CVD application 226. The CVD application 226 may be executed by processor 202 so as to carry out a variety of functions. For example, execution of CVD application 226 may cause data storage 204 to be searched to determine whether the data storage 204 contains a requested vehicle attribute.

If data storage 204 does not contain the requested vehicle attribute, the CVD application 226 may provide to the interceptor application 224 a non-match indicator indicating that data storage 204 does not contain the requested vehicle attribute. In response to receiving the non-match indicator, the interceptor application 224 may send to user interface 206 a request for the vehicle attribute. The user interface 206 may display a message to prompt a user to enter the vehicle attribute and thereafter receive the vehicle attribute via a data entry device of the user interface 206. The user interface 206 may provide the received vehicle attribute to the interceptor application 224 for transmission, in turn, to the requestor application.

If data storage 204 contains the requested vehicle attribute, the CVD application 226 may provide to the interceptor application a match indicator and the requested vehicle attribute. The match indicator may indicate whether the requested vehicle attribute provided to the interceptor application 224 is associated with the requester application or another application. In response to receiving the match indicator and the requested vehicle attribute, the interceptor application 224 may provide the requested vehicle attribute to the requestor application.

Each distinct application, such as the engine service application, may be considered a set of program instructions. In this regard, a set of program instructions may be arranged as a requester application. The data storage 204 may contain other sets of program instructions as well. Examples of these various sets of program instructions are described below. Each of these exemplary sets of program instructions could be combined with another set of program instructions or split apart into two or more sets of programs instructions.

Data storage 204 may contain a set of program instruction executable to cause processor 202 to perform a first search of data storage 204 so as to determine whether data storage 204 contains a vehicle attribute associated with the requester application. The processor 202 may execute these program instructions in response to receiving a request for a vehicle attribute or in response to the interceptor application receiving a request for a vehicle attribute from the requestor application.

Data storage 204 may contain a set of program instructions executable to cause a requested vehicle attribute to be provided to the requester application. This set of program instructions may be executable in response to determining that the requested vehicle attribute is stored in the data storage 204 (e.g., as one of the vehicle attributes 216) and/or in response to receiving the requested vehicle attribute from data storage 204.

Data storage 204 may contain a set of program instructions executable to cause processor 202 to perform a search of data storage 204 so as to determine whether data storage 204 contains the requested vehicle attribute for another application, such as another vehicle service application (e.g., an airbag service application or an HVAC service application). This other application is considered a non-requestor application. This set of program instructions may be executed in response to processor 202 determining that data storage 204 does not contain the requested vehicle attribute for the requestor application.

Data storage 204 may contain a set of program instructions executable to cause a vehicle attribute for the non-requestor application to be provided to the requestor application. This set of program instructions may executable in response to processor 202 determining that data storage 204 contains the requested vehicle attribute for the non-requestor application and/or in response to receiving the requested vehicle attribute for the non-requestor application from data storage 204.

Data storage 204 may contain a set of program instructions executable to cause user interface 206 to display a request for a user to enter the requested vehicle attribute, and to cause the vehicle attribute entered via the user interface to be provided to the requester application. This set of program instructions may be executed in response to processor 202 determining that the data storage does not contain the requested vehicle attribute for the non-requestor application.

Data storage 204 may contain a set of program instructions executable to cause processor 202 to use the requested attribute for the requestor application (i.e., a vehicle attribute associated with the requestor application) and/or the requested attribute for the non-requestor application (i.e., a vehicle attribute associated with the non-requestor application) so as to identify a vehicle under service. Alternatively, processor 202 may use a quantity of vehicle attributes greater than 2 vehicle attributes to identify a vehicle under service.

Data storage 204 may contain a set of program instruction executable to retrieve vehicle reference data associated with the identified vehicle under service and to cause user interface 206 to display the retrieved vehicle reference data. These program instructions may be executable in response to identifying a vehicle under service.

3. Exemplary Operation

Figure 3A:
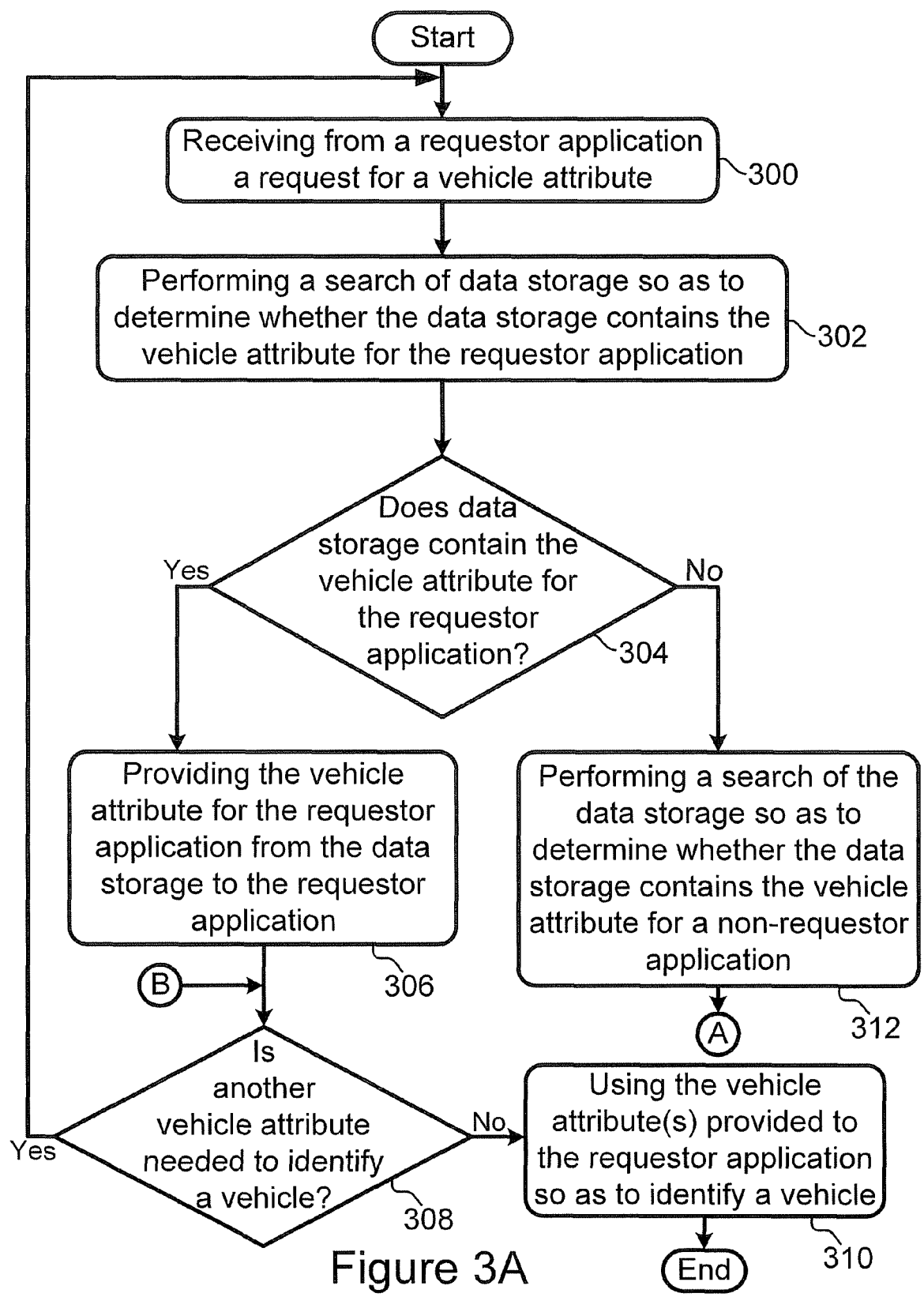
FIGS. 3A and 3B depict a flow chart showing functions that may be carried out in accordance with an exemplary embodiment.
Figure 3B:
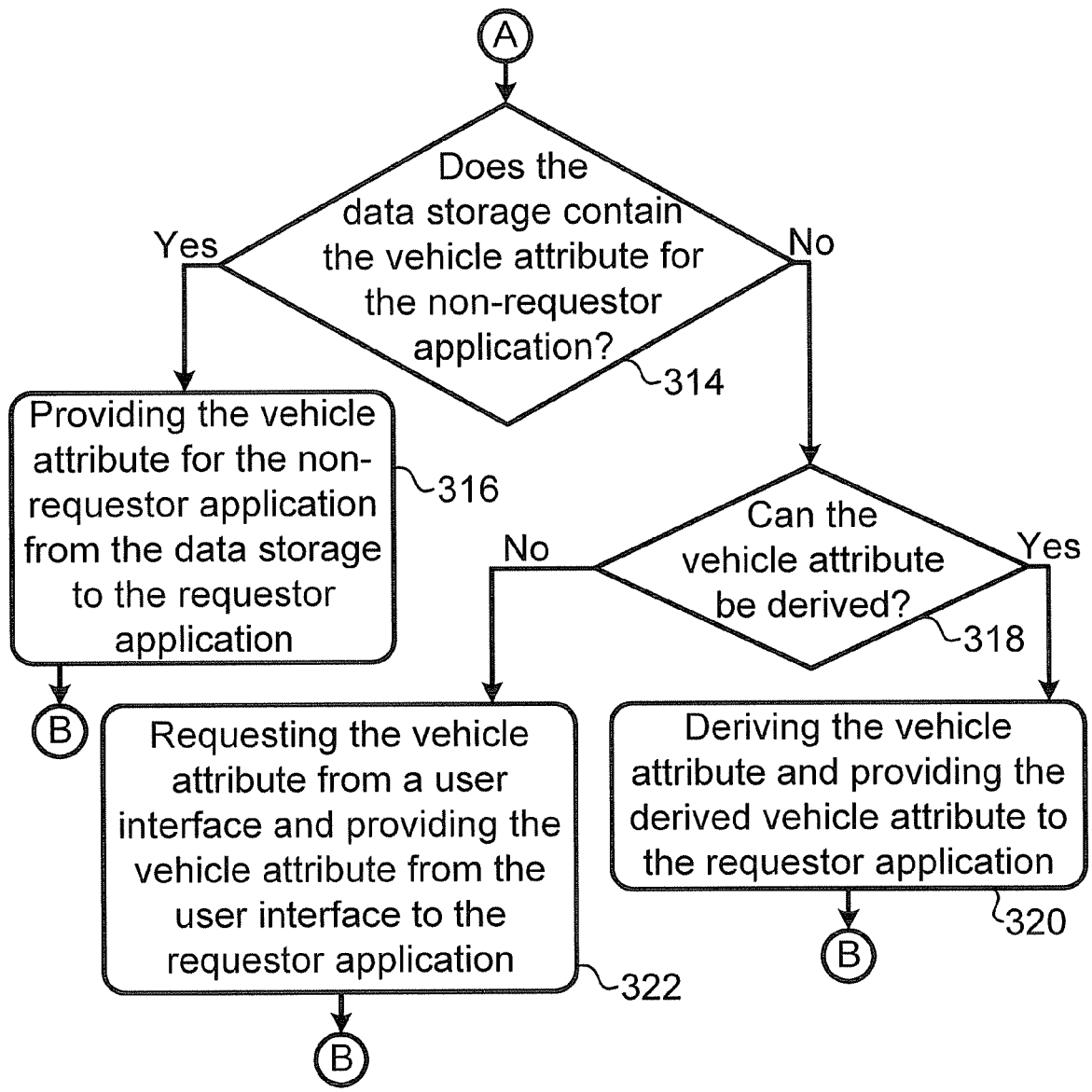

FIGS. 3A and 3B contain a flow chart provided to illustrate some of the functions that may be carried out in accordance with an exemplary embodiment. One or more functions shown in FIGS. 3A and 3B may be omitted.

For purposes of explaining the functions of FIGS. 3A and 3B, it is assumed that: (i) vehicle service tool 200 is connected to Vehicle 1 (which has the vehicle attributes shown in row 2 of Table 2), (ii) a requester application that requests a vehicle attribute is an engine service application needing a "year" attribute, a "make" attribute, a "model" attribute, and an "engine" attribute to be able to identify a vehicle under service, and (iii) the requested attribute is a "year" attribute.

Vehicle 1 may be taken to a service facility for service. The owner of Vehicle 1 may inform a manager of the service facility that she has experienced abnormal conditions with the vehicle's engine. A technician at the service facility may connect vehicle service tool 200 to Vehicle 1 to begin analyzing data retrievable from Vehicle 1.

The vehicle service tool 200 may receive a VIN associated with the vehicle under service (i.e., Vehicle 1). The vehicle service tool 200 may determine one or more vehicle attributes from the VIN. The vehicle service tool 200 may determine the one or more vehicle attributes from the VIN before or after the requester application is selected by a user of the vehicle service tool. As an example, the engine service application may be selected as the requestor application, and the processor 202 may execute program instructions to determine one or more vehicle attributes from the VIN.

As an example, the VIN associated with Vehicle 1 may include an alphanumeric character that indicates the type of engine installed in Vehicle 1. The processor 202 may refer to vehicle reference data associated with VINs to determine that the alphanumeric character indicating the type of engine installed in Vehicle 1 is a 3.4 L engine. After determining a vehicle attribute from a VIN, the vehicle attribute may be stored in the vehicle attributes 216, and data to associate the vehicle attribute to Vehicle 1 and the engine service application may be stored as association data 218.

As shown in FIG. 3A, block 300 includes receiving from a requester application a request for a vehicle attribute. The requester application (e.g., the Engine Service application) may comprise a vehicle service application of the vehicle service applications 222. The request for a vehicle attribute may be received at the interceptor application 224 and/or at the CVD application 226. In the case when the interceptor application 224 receives the request for the vehicle attribute, the interceptor application 224 may provide to the CVD application 226 another request for the vehicle attribute.

A request for the vehicle attribute may comprise a variety of data. As an example, the request for the vehicle attribute may comprise: (i) an indication of a vehicle attribute that is being requested (e.g., a "model year" attribute), (ii) an indication of the requester application (e.g., the engine service application), and (iii) an indicator associated with the vehicle under service (e.g., the VIN of Vehicle 1 or a repair order for Vehicle 1 generated by the service facility). Other examples of the data in the request for the vehicle attribute are also possible.

Next, block 302 includes performing a search of data storage 204 so as to determine whether data storage 204 contains the vehicle attribute for the requester application (i.e., the model year attribute for the Engine Service application). This search may be carried out by processor 202 searching the vehicle/attribute/application association data 218 for the vehicle attribute for the requester application and the vehicle under service. As an example, the search may include searching the association data 218 stored for the engine service application and stored for Vehicle 1. As shown, in Table 3, row 2, column 2, the association data 218 indicates that no vehicle attributes are stored for the engine service application and Vehicle 1.

Next, block 304 includes determining whether data storage 204 contains the vehicle attribute for the requester application. If a result of the search carried out at block 302 indicates data storage 204 contains the vehicle attribute for the requester application, a method using some or all of the functions shown in FIGS. 3A and 3B may continue at block 306. If on the other hand, a result of the search carried out at block 302 indicates data storage 204 does not contain the vehicle attribute for the requester application, a method using some or all of the functions shown in FIGS. 3A and 3B may continue at block 312.

Next, block 306 includes providing the vehicle attribute for the requestor application from the data storage 204 to the requester application. As an example, the CVD application 226 and/or the interceptor application 224 may provide the vehicle attribute to the requester application. In this regard, processor 202, by executing the CVD application 226 and/or the interceptor application 224, may provide the vehicle attribute to the requester application.

Next, block 308 includes determining whether another vehicle attribute is needed to identify a vehicle (e.g., Vehicle 1). If another vehicle attribute is needed, a method using some or all of the functions shown in FIGS. 3A and 3B may continue at block 300. If another vehicle attribute is not needed, a method using some or all of the functions shown in FIGS. 3A and 3B may continue at block 310. As an example, if the requestor application (the engine service application) has received the "model year" attribute, but still needs the "vehicle make" attribute, the "vehicle model" attribute, and the "engine" attribute to identify Vehicle 1, the method may continue at block 300 so that the requester can request one of the three remaining vehicle attributes still needed for identifying the vehicle.

Next, block 310 includes using the vehicle attribute(s) provided to the requestor application so as to identify a vehicle (e.g., Vehicle 1). As an example, the requestor application may have received a "model year" attribute, a "vehicle model" attribute, a "vehicle make" attribute, and an "engine" attribute for Vehicle 1, such that the requestor application can determine that Vehicle 1 is a 2004 Pontiac Grand Prix having a 3.4 L engine. Upon identifying Vehicle 1, the requester application may request vehicle reference data for a 2004 Grand Prix having a 3.4 L engine for use in analyzing Vehicle 1. Alternatively, the requestor application may require greater than or less than four attributes, or a different set of four attributes, to identify a vehicle.

The vehicle attribute(s) used to identify to identify a vehicle may be provided to the requester application in various ways. For example, the requester application may receive from data storage one or more vehicle attributes associated with the requester application, one or more vehicle attributes associated with a non-requestor application, one or more vehicle attributes determined from a VIN, and one or more vehicle attributes that are derived from an index of vehicle attributes. Details pertaining to deriving a vehicle attribute are described below.

Next, block 312 includes performing a search of the data storage 204 so as to determine whether the data storage 204 contains the vehicle attribute for a non-requestor application. As indicated above, the functions of block 312 may be carried out if data storage 204 does not contain the vehicle attribute for the requester application, as determined at block 304. As an example, the non-requestor application may comprise one of the vehicle service applications 222, such as an Airbag Service application or an HVAC Service application.

Additionally, a non-requestor application may be defined as a either a master application or a peer application. The vehicle attributes associated with a master application may be considered more trustworthy than vehicle attributes associated with any peer application. The search of data storage 204 may comprise searching for vehicle attributes from a master application prior to searching for vehicle attributes from a peer application. The requester application may be a peer application to other peer applications (such as other vehicle service applications) that function as a requester application when selected by a user of the vehicle service tool.

A master application may comprise an application that is considered to have the correct vehicle attributes for a vehicle under service. In one respect, a master application may be pre-selected. For instance, if vehicle service tool 200 is to be manufactured with four peer applications, e.g., peer application 1, peer application 2, peer application 3, and peer application 4, the manufacturer of vehicle service tool 200 may pre-select peer application 2 as the master application. Pre-selection of the master application may occur before the peer applications are compiled. In this regard, the master application (i.e., peer application 2 before being selected as the master application) may remain the master application so long as it is contained within the vehicle service tool 200, even if one or more of peer application 1, peer application 3, and peer application 4 are deleted or other peer applications are added to vehicle service tool 200.

In another respect, the master application may be the first peer application to identify the vehicle under service. For example, if peer application 3 is the first of peer applications 1, 2, 3, 4 to identify vehicle 104, peer application 3 may be defined as the master application for vehicle 104. Thereafter, when a vehicle other than vehicle 104 is connected to vehicle service tool 200, another peer application, e.g., peer application 1 may be the first peer application to identify the other vehicle and peer application 1 becomes the master application.

Next, block 314 includes determining whether the data storage 204 contains the vehicle attribute for the non-requestor application. Processor 202 may use a result of the search carried out at block 312 so as to make a determination whether data storage 204 contains the vehicle attribute for the non-requestor application. Processor 202 may make this determination for each of a plurality of non-requestor applications. In this regard, data storage 204 may be searched to determine whether the data storage 204 contains the vehicle attribute for each non-requestor application of the plurality of non-requestor applications.

If the determination indicates data storage 204 contains the vehicle attribute for a non-requestor application, a method using some or all of the functions shown in FIGS. 3A and 3B may continue at block 316. If on the other hand, the determination indicates that data storage 204 does not contain the vehicle attribute for a non-requestor application, a method using some or all of the functions shown in FIGS. 3A and 3B may continue at block 318.

Next, block 316 includes providing the vehicle attribute for the non-requestor application from the data storage 204 to the requestor application. As an example, the CVD application 226 and/or the interceptor application 224 may provide the vehicle attribute to the requestor application. In this regard, processor 202, by executing the CVD application 226 and/or the interceptor application 224, may provide the vehicle attribute to the requestor application.

Additionally, the vehicle attribute for the non-requestor application may be saved in data storage 204 (e.g., in the vehicle attributes 216 portion of data storage) as a vehicle attribute for the requestor application. The interceptor application 224 may provide the CVD application 226 with the vehicle attribute and data that associates the vehicle attribute with the requestor application and the vehicle under service. The CVD application 226 may cause the vehicle attribute to be stored as a vehicle attribute 316 and the data that associates the vehicle attribute, the requestor application, and the vehicle under service to be stored as association data 218.

After carrying out the functions of block 316, a method using some or all of the functions shown in FIGS. 3A and 3B may continue at block 308.

Next, block 318 includes making a determination whether the vehicle attribute can be derived. Processor 202 may execute smart-compare program instructions, stored at program instructions 220, to determine whether the vehicle attribute can be derived. The smart-compare program instructions may comprise program instructions that cause the processor 202 to compare vehicle attributes associated with other applications for the vehicle under service to an index of vehicle attributes and to determine whether a vehicle attribute associated with another application is listed in the index of vehicle attributes.

As an example, the index of vehicle attributes may indicate that a vehicle "make" attribute of "Chevrolet" indicates the same vehicle make as a vehicle "make" attribute of "Chevy."

As another example, during the first year of manufacture of a vehicle make having a unique vehicle model attribute (e.g., during the year 2003 for the vehicle model "Ion" manufactured by the Saturn division of General Motors), the index of vehicle attributes may indicate that for a vehicle under service having a vehicle model attribute of "Ion," the vehicle make attribute is "Saturn" and the model year attribute is "2003." Other examples of vehicle attributes that may be derived from an index of vehicle attributes, such as an engine-type attribute indicating the type of engine in a vehicle, a transmission-type attribute indicating the type of transmission in a vehicle, a country of manufacture attribute, a vehicle model attribute, a vehicle manufacturer attribute, and a vehicle system attribute, are also possible. The vehicle system attribute may identify the manufacturer or some other characteristic of a system, such as the manufacturer of an anti-lock braking system installed on a vehicle that may be manufactured with an anti-lock braking system from one of two or more manufacturers of anti-lock braking systems.

The smart-compare program instructions may comprise instructions for comparing a list of possible answers for a requested vehicle attributes to the vehicle attributes contained in the data storage 204. The comparison may be made to determine an identical match between an attribute from the list of possible answers and an attribute in data storage or for the vehicle attribute in data storage that most closely matches a vehicle attribute in the list of possible answers.

Next, block 320 includes deriving the vehicle attribute and providing the derived vehicle attribute to the requester application. Deriving a vehicle attribute may be carried out in various ways. For example, if the requestor application has requested a vehicle "make" attribute for a vehicle under service that has a vehicle make attribute of "Chevrolet," if the requestor application uses un-abbreviated vehicle attributes, and if a peer application has returned an abbreviated vehicle "make" attribute of "Chevy," then the smart-compare program instructions may compare "Chevy" to "Chevrolet" and determine that a "Chevrolet" vehicle make attribute can be derived from the "Chevy" vehicle make attribute. The determination made by the smart-compare program instructions may be made in response to a user of vehicle service tool 200 acknowledging that "Chevy" is an acceptable form of the vehicle make attribute "Chevrolet" of that "Chevrolet" is an acceptable form of the vehicle make attribute "Chevy."

After a vehicle attribute is derived, the processor 202 and/or the interceptor application 224 or the CVD application may provide the derived vehicle attribute to the requester application. Additionally, the derived vehicle attribute may be provided to data storage 204 for storage at the vehicle attributes 216 as an attribute for the requestor application, and data that associates the derived vehicle attribute with the requestor application and the vehicle under service may be provided to data storage 204 for storage as association data 218.

After carrying out the functions of block 320, a method using some or all of the functions shown in FIGS. 3A and 3B may continue at block 308.

Next, block 322 includes requesting the vehicle attribute from a user interface 206 and providing a vehicle attribute received from the user interface 206 to the requestor application. Requesting the vehicle attribute from user interface 206 may include interceptor application 224 causing processor 202 to send a request message to user interface 206. The request message may include data that causes user interface 206 to display a user prompt (e.g., a request), such as "Enter Model Year" on a display of user interface 206. Other user prompts could be displayed at user interface 206 to request a "model year" vehicle attribute or a different vehicle attribute.

Processor 202 may receive a vehicle attribute entered via user interface 206 and provide the received vehicle attribute to the requester application. In particular, interceptor application 224, while being executed by processor 202, may receive the vehicle attribute entered via user interface 206. In response to receiving the vehicle attribute, the interceptor application 224 may provide the received vehicle attribute to the requestor application. Additionally, the interceptor application 224 may cause processor 202 to transmit the vehicle attribute received from user interface 206 to the CVD application 226 and/or to data storage 204 along with a request to store the requested vehicle attribute for the requestor application. If the vehicle attribute received from user interface 206 is transmitted to the CVD application 226, CVD application 226 may transmit the vehicle attribute to data storage 204 along with a request to store the requested vehicle attribute for the requester application.

After storage of the vehicle attribute for the requestor application, the next time the requestor application is used (e.g., on a subsequent day Vehicle 1 is taken to a service facility for service), the requester application may receive the vehicle attribute (e.g., "model year") from data storage 204 without requiring a user to enter the vehicle attribute via user interface 206. In other words, the requestor application may receive the requested vehicle attribute stored in data storage 204 for the requester application.

After carrying out the functions of block 322, a method using some or all of the functions shown in FIGS. 3A and 3B may continue at block 308.

4. Conclusion

Example embodiments of a system and method have been described above. Those skilled in the art will understand, however, that changes and modifications may be made to these examples without departing from the true scope and spirit of the described systems and methods. The embodiments described in this description and the accompanying drawings are set forth for illustration and not as a limitation.

Finally, the word "exemplary" is used herein to mean "serving as an example, instance, or illustration." Any embodiment described herein as "exemplary" is not necessarily to be construed as preferred or advantageous over other embodiments.

We claim:

1. A method, carried out via a vehicle service tool including computer-readable data storage, a user interface, and a requestor application that requests vehicle attributes, the method comprising:

receiving, from the requestor application, a first request for a first attribute of a given vehicle, wherein the first request for the first attribute of the given vehicle comprises (i) an indicator associated with the given vehicle, (ii) an indicator of the requestor application, and (iii) an indicator of the first vehicle attribute; and performing a first search of the data storage so as to determine whether the data storage contains the first attribute of the given vehicle as an attribute for both the requestor application and the given vehicle;

wherein, if a result of the first search indicates that the data storage contains the first attribute of the given vehicle as an attribute for both the requestor application and the given vehicle, the method further comprises providing, from the data storage to the requestor application, the first attribute of the given vehicle contained within the data storage as an attribute for both the requestor application and the given vehicle, wherein, if the result of the first search indicates that the data storage does not contain the first attribute of the given vehicle as an attribute for both the requestor application and the given vehicle, the method further comprises performing a second search of the data storage so as to determine whether the data storage contains the first attribute of the given vehicle as an attribute associated with both another application and the given vehicle, and wherein, if a result of the second search indicates that the data storage contains the first attribute of the given vehicle as an attribute for both the other application and the given vehicle, the method further comprises providing, from the data storage to the requestor application, the first attribute of the given vehicle contained with the data storage as an attribute for both the other application and the given vehicle.

2. The method of claim 1, wherein, if the result of the second search indicates that the data storage does not contain the first attribute of the given vehicle for both the other application and the given vehicle, the method further comprises: (i) displaying at the user interface a request for a user to enter the first vehicle attribute of the given vehicle, (ii) receiving from the user interface the first attribute of the given vehicle, and (iii) providing the first attribute of the given vehicle, received from the user interface, to the requestor application.

3. The method of claim 2, further comprising after performing the second search:

at the data storage, storing the first attribute of the given vehicle received from the user interface as the first attribute of the given vehicle for both the requestor application and the given vehicle;

receiving from the requestor application a second request for the first attribute of the given vehicle, wherein the second request for the first attribute of the given vehicle comprises (i) the indicator associated with the given vehicle, (ii) the indicator of the requestor application, and (iii) the indicator of the first vehicle attribute;

performing a third search of the data storage, wherein the third search is carried out to determine whether the data storage contains the first attribute of the given vehicle for both the requestor application and the given vehicle, and providing to the requestor application from the data storage the stored first attribute of the given vehicle for both the requestor application and the given vehicle.

4. The method of claim 1, further comprising:

performing a third search of the data storage so as to determine whether the data storage contains the first attribute of the given vehicle for any of at least one other application, wherein the third search is performed if the result of the second search indicates that the data storage does not contain the first attribute of the given vehicle for the other application and the given vehicle;

wherein if a result of the third search indicates that the data storage contains the first attribute of the given vehicle for any of the at least one other application and the given vehicle, providing to the requestor application the first attribute of the given vehicle for one of the at least one other application and the other vehicle, and wherein if the result of the third search indicates that the data storage does not contain the first attribute of the given vehicle for any of the at least one other application, the method further comprises: (i) displaying at the user interface a request for a user to enter the first attribute of the given vehicle, (ii) receiving from the user interface the first attribute of the given vehicle, and (iii) providing the first attribute of the given vehicle, received from the user interface, to the requestor application.

5. The method of claim 4,
wherein the other application is defined as a master application, and
wherein each of the at least one other application is associated with at least one vehicle attribute.

6. The method of claim 5,
wherein the master application comprises a pre-selected peer application, and
wherein the master application remains the master application for all vehicles connected to the vehicle service tool.

7. The method of claim 5,
wherein the master application comprises an application that first identifies the given vehicle, and
wherein another application that first identifies another vehicle becomes the master application for the other vehicle.

8. The method of claim 1, further comprising:
performing a third search of the data storage so as to determine whether the data storage contains any vehicle attributes from which the first attribute of the given vehicle may be derived, wherein the third search is performed if the result of the second search indicates that the data storage does not contain the first attribute of the given vehicle as an attribute for both the other application and the given vehicle;
wherein if a result of the third search indicates that the data storage contains a vehicle attribute from which the first attribute of the given vehicle may be derived, the method further comprises deriving the first attribute of the given vehicle and providing the derived first attribute of the given vehicle to the requestor application, and
wherein if the result of the third search indicates that the data storage does not contain any vehicle attributes from which the first attribute of the given vehicle may be derived, the method further comprises: (i) displaying at the user interface a request for a user to enter the first attribute of the given vehicle, (ii) receiving from the user interface the first attribute of the given vehicle, and (iii) providing the first attribute of the given vehicle, received from the user interface, to the requestor application.

9. The method of claim 8,
wherein the vehicle attribute from which the first attribute of the given vehicle may be derived is a vehicle attribute selected from the group consisting of: (i) a vehicle model year attribute, (ii) a vehicle make attribute, (iii) a vehicle model attribute, (iv) a vehicle engine-type attribute, (v) a vehicle transmission-type attribute, (vi) a vehicle system attribute, (vii) a vehicle manufacturer attribute, and (viii) a country of manufacture attribute, and
wherein the derived attribute of the given vehicle is selected from the group consisting of: (i) a vehicle model year attribute, (ii) a vehicle make attribute, (iii) a vehicle model attribute, (iv) a vehicle engine-type attribute, (v) a vehicle transmission-type attribute, (vi) a vehicle system attribute, (vii) a vehicle manufacturer attribute, and (viii) a country of manufacture attribute.

10. The method of claim 1, further comprising:
at the data storage, storing the first attribute of the given vehicle for both the other application and the given vehicle as the first attribute of the given vehicle for both the requestor application and the given vehicle;
receiving from the requestor application a second request for the first attribute of the given vehicle, wherein the second request for the first attribute of the given vehicle comprises (i) the indicator associated with the given vehicle, (ii) the indicator of the requestor application, and (iii) the indicator of the first attribute of the given vehicle;
performing a third search of the data storage so as to determine whether the data storage contains the first attribute of the given vehicle for both the requestor application and the given vehicle, and
providing to the requestor application from the data storage the stored first attribute of the given vehicle for both the requestor application and the given vehicle.

11. The method of claim 1, further comprising:
using at least the first attribute of the given vehicle for both the requestor application and the given vehicle or the first attribute of the given vehicle for both the other application and the given vehicle so as to identify the given vehicle;
receiving from the data storage vehicle reference data for the identified vehicle; and
displaying the vehicle reference data on a display device of the vehicle service tool.

12. The method of claim 1, further comprising:
receiving from the requestor application a request for a second attribute of the given vehicle; and
performing a third search of the data storage so as to determine whether the data storage contains the second attribute of the given vehicle for the requestor application and the given vehicle;
wherein if a result of the third search indicates that the data storage contains the second attribute of the given vehicle for the requestor application and the given vehicle, the method further comprising providing the second attribute of the given vehicle for the requestor application and the given vehicle from the data storage to the requestor application,
wherein if the result of the third search indicates that the data storage does not contain the second attribute of the given vehicle for the requestor application and the given vehicle, the method further comprises performing a fourth search of the data storage so as to determine whether the data storage contains the second attribute of the given vehicle for the other application and the given vehicle, and
wherein if a result of the fourth search indicates that the data storage contains the second attribute of the given vehicle for the other application and the given vehicle, the method further comprises providing the second attribute of the given vehicle for the other application and the given vehicle from the data storage to the requestor application.

13. The method of claim 12, further comprising:
using to identify the given vehicle: (i) the first attribute of the given vehicle for both the requestor application and the given vehicle or the first attribute of the given vehicle for both the other application and the given vehicle, and (ii) the second attribute of the given vehicle for both the requestor application and the given vehicle or the second attribute of the given vehicle for both the other application and the given vehicle; and
receiving from the data storage vehicle reference data for the identified vehicle.

14. The method of claim 1, wherein the indicator associated with the given vehicle comprises a vehicle identification number of the given vehicle.

15. The method of claim 1, wherein the indicator associated with the given vehicle comprises a repair order indicator generated by a service facility at which the given vehicle is to be serviced.

16. The method of claim 1, further comprising:
connecting the vehicle service tool to the given vehicle via an interface cable, wherein the given vehicle comprises a vehicle selected from the group consisting of an automobile, a truck, a boat, a ship, a motorcycle, or an airplane.

17. The method of claim 1, further comprising:
the vehicle service tool interfacing to the given vehicle via an air interface so that the vehicle service tool can communicate wirelessly with the given vehicle, wherein the given vehicle comprises a vehicle selected from the group consisting of an automobile, a truck, a boat, a ship, a motorcycle, or an airplane.

18. A vehicle service tool comprising:
a user interface;
a processor; and
data storage containing: (i) a computer-readable requestor application, (ii) a computer-readable interceptor application, and (iii) a computer-readable common vehicle descriptor (CVD) application,
wherein the requestor application, the interceptor application, and the CVD application are executable by the processor,
wherein the requestor application provides to the interceptor application a first request for a vehicle attribute, and receives from the interceptor application the requested vehicle attribute,
wherein the interceptor application (i) receives from the requestor application the first request for the vehicle attribute and responsively provides the CVD application with a second request for the vehicle attribute, and (ii) receives from the CVD application (a) a non-match indicator, or (b) a match indicator and the requested vehicle attribute,
wherein in response to receiving the non-match indicator, the interceptor application provides to the user interface a third request for the vehicle attribute, receives the requested vehicle attribute from the user interface, and provides the requested vehicle attribute to the requestor application,
wherein in response to receiving the match indicator, the interceptor application provides the requested vehicle attribute received from the CVD application to the requestor application, and
wherein the CVD application: (i) searches the data storage to determine whether the data storage contains the requested vehicle attribute, and (ii) provides to the interceptor application the non-match indicator if the data storage does not contain the requested vehicle attribute or provides to the interceptor application the match indicator and the requested vehicle attribute if the data storage contains the requested vehicle attribute.

19. The vehicle service tool of claim 18,
wherein the interceptor application further provides the CVD application with the requested vehicle attribute received from the user interface, and
wherein the CVD application causes the data storage to store the vehicle attribute received from the user interface as a vehicle attribute for the requestor application.

20. A vehicle service tool comprising:
a user interface;
a processor; and
data storage containing computer-readable program instructions executable by the processor,
wherein the computer-readable program instructions comprise:
(i) a first set of program instructions arranged as a first application that requests a first vehicle attribute for use in identifying a vehicle,
(ii) a second set of program instructions arranged as second application associable with a vehicle attribute,
(iii) a third set of program instructions executable to cause the processor to perform a first search of the data storage so as to determine whether the data storage contains the first vehicle attribute for the first application, wherein the third set of program instructions are executed in response to the first application requesting the first vehicle attribute,
(iv) a fourth set of program instructions executable to cause the first vehicle attribute for the first application to be provided to the first application, wherein the fourth set of program instructions are executed if a result of the first search indicates the data storage contains the first vehicle attribute for the first application,
(v) a fifth set of program instructions executable to cause the processor to perform a second search of the data storage to determine whether the data storage contains the first vehicle attribute for the second application, wherein the fifth set of program instructions are executed if the result of the first search indicates the data storage does not contain the first vehicle attribute for the first application, and
(vi) a sixth set of program instruction executable to cause the first vehicle attribute for the second application to be provided to the first application, wherein the sixth set of program instructions are executed if a result of the second search indicates the data storage contains the first vehicle attribute for the second application.

21. The vehicle service tool of claim 20,
wherein the computer-readable program instructions further comprise a seventh set of program instruction executable to cause the user interface to display a request for a user to enter the first vehicle attribute, and to provide first vehicle attribute entered via the user interface to the first application, and
wherein the seventh set of program instructions are executed if the result of the second search indicates the data storage does not contain the first vehicle attribute for the second application.

22. The vehicle service tool of claim 21,
wherein the data storage contains vehicle reference data associated with the vehicle,
wherein the computer-readable program instructions further comprise: (i) an eighth set of program instructions executable to cause the processor to use the first vehicle attribute of the first application or the first vehicle attribute of the second application so as to identify the vehicle, and (ii) a ninth set of computer-readable program instructions executable to retrieve at least a portion of the vehicle reference data associated with the vehicle and to cause the user interface to display the retrieved vehicle reference data.

23. The vehicle service tool of claim 20,
wherein the computer-readable program instructions further comprise a seventh set of program instructions that cause the first vehicle attribute for the second application to be stored in the data storage as the first vehicle attribute for the first application.

* * * * *